(12) United States Patent
Girard

(10) Patent No.: US 12,710,363 B2
(45) Date of Patent: Aug. 18, 2026

(54) THERMO-OPTIC COEFFICIENT MEASUREMENT SYSTEMS

(71) Applicant: Simmonds Precision Products, Inc., Vergennes, VT (US)

(72) Inventor: Joshua Girard, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 152 days.

(21) Appl. No.: 18/540,412

(22) Filed: Dec. 14, 2023

(65) Prior Publication Data

US 2025/0198920 A1 Jun. 19, 2025

(51) Int. Cl.
*G01N 21/41* (2006.01)

(52) U.S. Cl.
CPC ... *G01N 21/4133* (2013.01); *G01N 2021/414* (2013.01); *G01N 2201/06113* (2013.01)

(58) Field of Classification Search
CPC ......... G01N 21/4133; G01N 2021/414; G01N 2201/06113
See application file for complete search history.

(56) References Cited

U.S. PATENT DOCUMENTS 8,724,117 B2 5/2014 Kim et al.
8,759,789 B2 * 6/2014 Laitinen ................ G01N 21/13 356/246

(Continued)

FOREIGN PATENT DOCUMENTS

CN 217738981 U 11/2022
JP 04920373 B2 2/2012

OTHER PUBLICATIONS

Mironnikov, N. G., et al. "Study of optical and thermo-optical properties of a hybrid photopolymer material based on thiol-siloxane and tetraacrylate oligomer." Optoelectronics, Instrumentation and Data Processing 52 (2016): 180-186 (Year: 2016).*

(Continued)

*Primary Examiner* — Kara E. Geisel
*Assistant Examiner* — Roberto Fabian, Jr.
(74) *Attorney, Agent, or Firm* — Tucker Ellis LLP

(57) ABSTRACT

A thermo-optic coefficient measurement system can include a housing structure configured to retain at least a first plate sample, a second plate sample, and a third plate sample in a stacked, alternating stagger arrangement such that a gap exists between the first plate sample and the third plate sample that is the thickness of the second plate sample. The system can also include a first optical device connected to the housing to output a first laser configured to be coincident with the first plate sample and the third plate sample. The first optical device can be configured to receive a first return signal. The system can also include a second optical device connected to the housing to output a second laser configured to be coincident with the second plate sample, the second optical device can be configured to receive a second return signal. The system can include an optical interrogator module configured to be connected to the first optical device to output the first laser thereto and to receive the first return signal therefrom. The optical interrogator module can be configured to be connected to the second optical device to output the second laser thereto and to receive the second return signal therefrom. The optical interrogator module can be configured to determine a thermo-optical coefficient as a function of the first return signal and the second return signal at a plurality of temperatures.

15 Claims, 1 Drawing Sheet

(56) References Cited

U.S. PATENT DOCUMENTS

| | | |
|---|---|---|
| 9,046,494 B2 | 6/2015 | Song et al. |
| 2009/0065478 A1 | 3/2009 | Dockery et al. |

OTHER PUBLICATIONS

Jewell, John M., Charles Askins, and Ishwar D. Aggarwal. "Interferometric method for concurrent measurement of thermo-optic and thermal expansion coefficients." Applied optics 30.25 (1991): 3656-3660 (Year: 1991).*

Moreno-Hernández, Carlos. "Fiber optic Fabry-Perot interferometer for contactless sensing." (2016) (Year: 2016).*

Zilio, Sérgio Carlos. "Simultaneous thickness and group index measurement with a single arm low-coherence interferometer." Optics express 22.22 (2014): 27392-27397 (Year: 2014).*

Chen Tei-Chen et al: "Determination of stress-optical and thermal-optical coefficients of Nb2O5 thin film material", Journal of Applied Physics, American Institute of Physics, vol. 101, No. 4, Feb. 23, 2007, pp. 43513-043513.

Extended European Search Report dated Jan. 28, 2025, for corresponding European Patent Application No. 24190697.3, 10 pgs.

Jewell J Met al: "Interferometric Method for Concurrent Measurement of Thermo-Optic and Thermal Expansion Coefficients", Applied Optics, Optical Society of America, Washington, DC, US, vol. 30, No. 25, Sep. 1, 1991 (Sep. 1, 1991), pp. 3656-3660.

Jose Carlos Moreno Hernandez, "Fiber Optic Fabry-Perot Interferometer for Contactless Sensing", Oct. 2016, Retrieved from the Internet: URL:http://cio.repositorioinstitucional.mx /jspui/bitstream/1002/125/1/16868.pdf, pp. 66-69.

Zilio S. C.: "Simultaneous thickness and group index measurement with a single arm low-coherence interferometer", Optics Express, vol. 22, No. 22, Oct. 28, 2014 (Oct. 28, 2014), p. 27392.

* cited by examiner

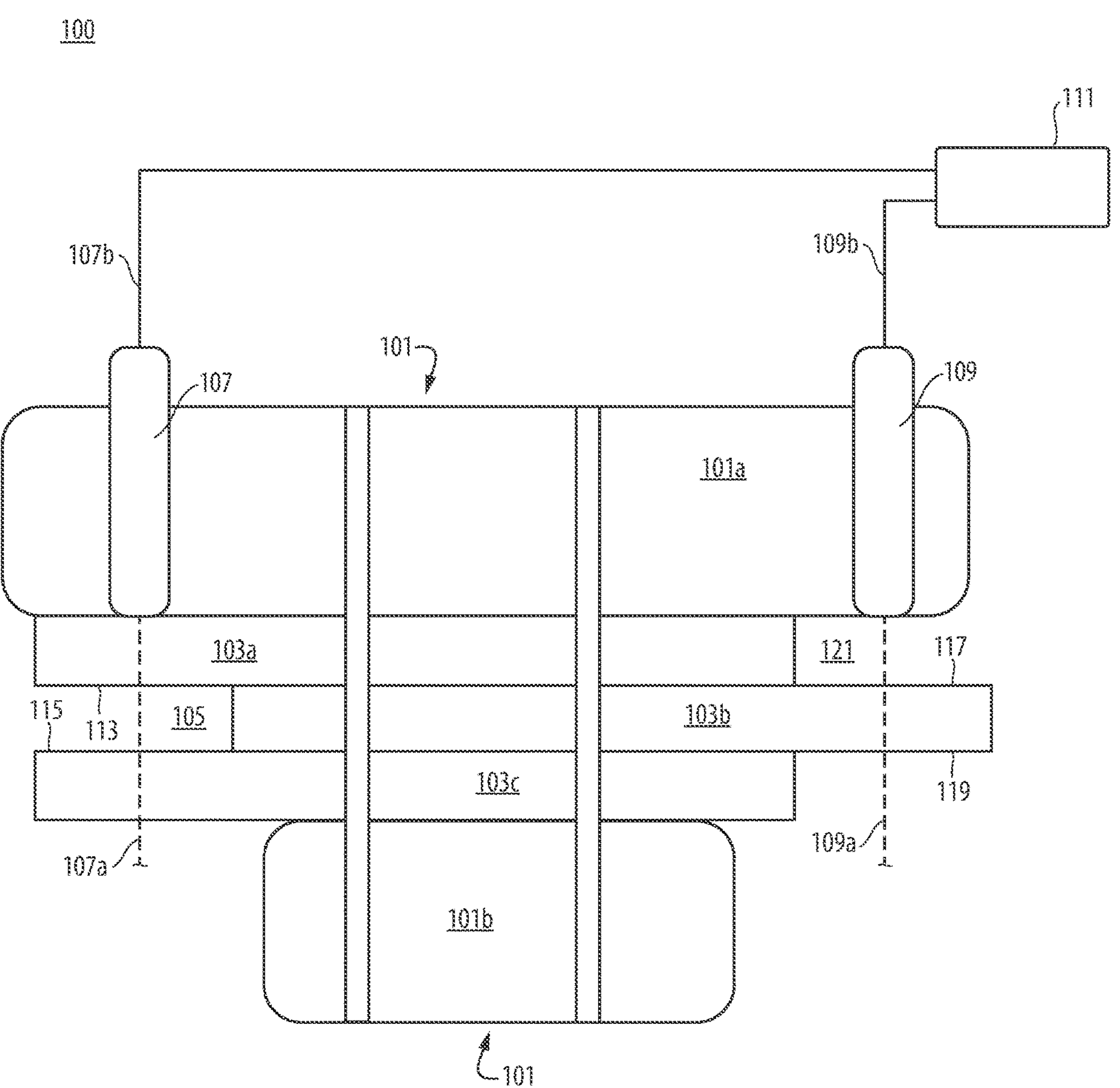
100
111
107b
109b
101
107
109
101a
103a
121
117
115
113
105
103b
103c
119
107a
109a
101b
101

THERMO-OPTIC COEFFICIENT MEASUREMENT SYSTEMS

FIELD

This disclosure relates to thermo-optic coefficient measurement systems.

BACKGROUND

Effects on optical structures due to heat include thermo-optic effect and thermal expansion. It is traditionally impossible to tell what optical change is due to the thermo-optic effect or due to the physical dimensional change of a sample in certain circumstances. Determination of the thermo-optic coefficient for optical solids using thin plates requires a precise thickness dimension to be known to a precision level which difficult to achieve. For example, thermo-optic effect is effective on the order of 0.00001 inches, and existing measurements are dependent on the index of refraction often measured to about the third decimal place. Accordingly, this level of accuracy of is not acceptable for extremely thin samples, or certain high precision applications.

Such conventional methods and systems have generally been considered satisfactory for their intended purpose. However, there is still a need in the art for improvements. The present disclosure provides a solution for this need.

SUMMARY

A thermo-optic coefficient measurement system can include a housing structure configured to retain at least a first plate sample, a second plate sample, and a third plate sample in a stacked, alternating stagger arrangement such that a gap exists between the first plate sample and the third plate sample that is the thickness of the second plate sample. The system can also include a first optical device connected to the housing to output a first laser configured to be coincident with the first plate sample and the third plate sample. The first optical device can be configured to receive a first return signal. The system can also include a second optical device connected to the housing to output a second laser configured to be coincident with the second plate sample, the second optical device can be configured to receive a second return signal. The system can include an optical interrogator module configured to be connected to the first optical device to output the first laser thereto and to receive the first return signal therefrom. The optical interrogator module can be configured to be connected to the second optical device to output the second laser thereto and to receive the second return signal therefrom. The optical interrogator module can be configured to determine a thermo-optical coefficient as a function of the first return signal and the second return signal at a plurality of temperatures.

In certain embodiments, the thermo-optical interrogator module can be configured to determine optical coefficient as a function of harmonic wavelengths of the first return signal and the second return signal. In certain embodiments, the first laser can be configured to sense a change in optical path between a rear surface of the first plate sample and a front surface of the third plate sample as a function of temperature. The second laser can be configured to sense a change in optical path between a front surface of the second plate sample and a rear surface of a second plate sample as a function of temperature, and wherein the optical interrogator module is configured to cancel out temperature induced effects due to optical path change of the second plate sample by comparing the first return signal to the second return signal resulting in determining effects on the second plate sample due only to thermo-optic effect.

In certain embodiments, the system can include the first, second, and third plate samples. In certain embodiments, the first optical device abuts the first plate sample. In certain embodiments, the second optical device is spaced from the second plate sample. In certain embodiments, the first and third plate samples are outside a cone of influence of the second optical device. In certain embodiments, the housing includes one or more portions configured to sandwich the first, second, and third plate samples together without inducing stress effects on an optically relevant order of magnitude.

In certain embodiments, the optical interrogator module is configured to determine index of refraction of the plate samples as a function of the ratio of a static optical path measurements of the first return signal and the second return signal taken at a fixed temperature. The index of refraction can be used in calculating the thermo-optic coefficient.

In accordance with at least one aspect of this disclosure, a method can include retaining a first plate sample, a second plate sample, and a third plate sample in a stacked, alternating stagger arrangement such that a gap exists between the first plate sample and the third plate sample that is the thickness of the second plate sample, and interrogating the first plate sample with a first laser coincident with the first plate sample and the third plate sample, and receiving a first return signal thereof at a plurality of temperatures. The method can include interrogating the second plate sample with a second laser coincident with the second plate sample, and receiving a second return signal thereof at the plurality of temperatures, and determining a thermo-optical coefficient as a function of the first return signal and the second return signal at the plurality of temperatures.

In certain embodiments, determining the thermo-optical coefficient includes using harmonic wavelengths of the first return signal and the second return signal. In certain embodiments, determining the thermo-optical coefficient includes cancelling out temperature induced effects due to optical path change of the second plate sample by comparing the first return signal to the second return signal resulting in determining effects on the second plate sample due only to thermo-optic effect.

In certain embodiments, retaining the plate samples includes abutting the first plate sample to a first optical device. In certain embodiments, retaining the plate samples includes spacing second plate sample from a second optical device. The first and third plate samples are outside a cone of influence of the second optical device.

In certain embodiments, retaining the plate samples includes sandwiching the first, second, and third plate samples together without inducing stress effects on an optically relevant order of magnitude. In certain embodiments, the method can include holding temperature fixed and determining an index of refraction of the plate samples as a function of the ratio of a static optical path measurements of the first return signal and the second return signal taken at the fixed temperature.

In accordance with at least one aspect of this disclosure, a system can include an optical interrogator module configured to be connected to a first optical device to output the first laser thereto and to receive the first return signal therefrom. The optical interrogator module can include any suitable optical interrogator module and/or one or more portions thereof disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic elevation view of an embodiment of a thermo-optic coefficient measurement system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Certain embodiments described herein can be used to measure the thermo-optic coefficient of optical materials.

Referring to FIG. 1, a thermo-optic coefficient measurement system 100 can include a housing structure 101 configured to retain at least a first plate sample 103*a*, a second plate sample 103*b*, and a third plate sample 103*c* in a stacked, alternating stagger arrangement (e.g., as shown in FIG. 1) such that a gap 105 exists between the first plate sample 103*a* and the third plate 103*c* sample that is the thickness of the second plate sample 103*b*. The system 100 can also include a first optical device 107 connected to the housing 101 (e.g., to a left side of a first portion 101*a*) to output a first laser 107*a* configured to be coincident with the first plate sample 103*a* and the third plate sample 103*c*. The first optical device 107 can be configured to receive a first return signal.

The system 100 can also include a second optical device 109 connected to the housing 101 (e.g., to a right side of the first portion 101*a*) to output a second laser 109*a* configured to be coincident with the second plate sample 103*b*. The second optical device 109 can be configured to receive a second return signal.

The system 100 can include an optical interrogator module 111 configured to be connected to the first optical device 107 to output the first laser 107*a* thereto and to receive the first return signal therefrom (e.g., on a first channel 107*b*). The optical interrogator module 111 can be configured to be connected to the second optical device 109 to output the second laser 109*a* thereto and to receive the second return signal therefrom (e.g., on a second channel 109*b*). The optical interrogator module 111 can be configured to determine a thermo-optical coefficient as a function of the first return signal and the second return signal at a plurality of temperatures.

The plate samples 103*a, b, c* can form two Fabry Perot etalons, one on a first side (e.g., left as shown) formed by two layers and an air gap providing two reflective surfaces, and one on a second side (e.g., right as shown) formed by a single layer having front and back reflective surfaces. In certain embodiments, the thermo-optical interrogator module 111 can be configured to determine optical coefficient as a function of harmonic wavelengths of the first return signal and the second return signal. In certain embodiments, the first laser 107*a* can be configured to sense a change in optical path (e.g., a distance traveled by the laser) between a rear surface 113 of the first plate sample 103*a* and a front surface 115 of the third plate 103*c* sample as a function of temperature. All other reflected component signals can be filtered out as appreciated by those having ordinary skill in the art in view of this disclosure. The second laser 109*a* can be configured to sense a change in optical path between a front surface 117 of the second plate sample 103*b* and a rear surface 119 of a second plate sample 103*b* as a function of temperature.

The optical interrogator module 111 can be configured to cancel out temperature induced effects due to optical path change of the second plate sample 103*b* by comparing the first return signal to the second return signal resulting in determining effects on the second plate sample 103*b* due only to thermo-optic effect.

In certain embodiments, the system 100 can include the first, second, and third plate samples 103*a, b, c*. The plate samples can be flat plates as shown. In certain embodiments, the first optical device 107 can abut the first plate sample 103*a* (e.g., flushly). In certain embodiments, the second optical device 109 is spaced from the second plate sample 103*b* (e.g., such that there is an air gap 121 between the housing portion 101*a* and the second plate sample 103*b*). In certain embodiments, the first plate sample 103*a* and third plate sample 103*c* are positioned to be outside a cone of influence of the second optical device 109 (e.g., so that the second laser is not affected by the first plate sample 103*a* or third plate sample 103*c*). In certain embodiments, the housing 101 can include one or more portions (e.g., a first portion 101*a* and a second portion 101*b*) configured to sandwich the first, second, and third plate samples 103*a, b, c* together (e.g., as shown, e.g., via one or more straps) without inducing stress effects on an optically relevant order of magnitude.

In certain embodiments, the optical interrogator module 111 can be configured to determine index of refraction of the plate samples 103*a, b, c* (e.g., which can all be made of the same material) as a function of the ratio of a static optical path measurements of the first return signal and the second return signal taken at a fixed temperature. The index of refraction can be used in calculating the thermo-optic coefficient (e.g., as appreciated by those having ordinary skill in the art in view of this disclosure).

In accordance with at least one aspect of this disclosure, a method can include retaining a first plate sample, a second plate sample, and a third plate sample in a stacked, alternating stagger arrangement such that a gap exists between the first plate sample and the third plate sample that is the thickness of the second plate sample, and interrogating the first plate sample with a first laser coincident with the first plate sample and the third plate sample, and receiving a first return signal thereof at a plurality of temperatures. The method can include interrogating the second plate sample with a second laser coincident with the second plate sample, and receiving a second return signal thereof at the plurality of temperatures, and determining a thermo-optical coefficient as a function of the first return signal and the second return signal at the plurality of temperatures.

In certain embodiments, determining the thermo-optical coefficient includes using harmonic wavelengths of the first return signal and the second return signal. In certain embodiments, determining the thermo-optical coefficient includes cancelling out temperature induced effects due to optical path change of the second plate sample by comparing the first return signal to the second return signal resulting in determining effects on the second plate sample due only to thermo-optic effect.

In certain embodiments, retaining the plate samples includes abutting the first plate sample to a first optical device. In certain embodiments, retaining the plate samples includes spacing second plate sample from a second optical device. The first and third plate samples are outside a cone of influence of the second optical device.

In certain embodiments, retaining the plate samples includes sandwiching the first, second, and third plate samples together without inducing stress effects on an optically relevant order of magnitude. In certain embodiments, the method can include holding temperature fixed and determining an index of refraction of the plate samples as a function of the ratio of a static optical path measurements of the first return signal and the second return signal taken at the fixed temperature.

In accordance with at least one aspect of this disclosure, a system can include an optical interrogator module configured to be connected to a first optical device to output the first laser thereto and to receive the first return signal therefrom. The optical interrogator module can include any suitable optical interrogator module and/or one or more portions thereof disclosed herein, e.g., as described above.

Embodiments can be used to measure the thermo-optic effect (e.g., a change of index of refraction over temperature) even for very small structures and at small magnitudes of effect for precision optics. Existing measurements are rarely available, and are not precise. Embodiments can also be used to measure static index of refraction at a fixed temperature which can be used to calculate the thermo-optic coefficient.

In certain embodiments, due to the physical arrangement of flat plate samples, a change in optical path between one side as a function of temperature can be subtracted from the change in optical path from of the other side. In embodiments, the resulting signal is the change of the single sample side due only to thermo-optical effect, for example. Also, the ratio of the static optical path measurement on both sides at a fixed temperature allows calculation of index of refraction. It can be equally as challenging to find index of refraction data at the needed precision, and using actual samples provides an actual measurement of an actual set up which cannot be gained by picking an index of refraction from available research.

Embodiments can include a sandwich structure that holds layers together firmly but without significant stress on the samples (e.g., significant being anything that has an optical effect on the order of interest). Distance to reflective surfaces can be measured based on harmonic wavelengths (e.g., which is relates to the distance between a first reflective surface and a second reflective surface), and a distance between peaks of those harmonics.

Embodiments can include an optical interrogator that has a single laser source split into multiple output channels. Embodiments can include optical outputs/receivers (e.g., lenses) that have a negligible optical effect that can be filtered out or simply not considered in the calculations. Embodiments can include an air gap, considered to be or form part of a thickness compensating etalon. Embodiments of a system can be about 1 inch thick total, or any other suitable size.

Certain embodiments can include a method and apparatus for measuring thermo-optic effect in optical material samples. Determination of the Thermo-Optic Coefficient for optical solids using thin plates requires a precise thickness dimension to be known. Embodiments can compensate for that directly. Additionally, thermal expansion is coupled with the thermo-optic effect. Embodiments can allow that to be compensated for as well, thus decoupling the two effects so that variability in thermal expansion does not impact uncertainty on thermo-optic measurements.

Certain embodiments can include stacking three optical samples on each other with the middle one offset, creating (on one side) a single Fabry Perot etalon, and on the other side, a series of Fabry-Perot etalons, one of which is air. Into each side, a single channel from the tuned laser optical interrogator can be shone and data recorded. The apparatus having the samples can be heated to known temperatures. Using suitable interrogation algorithms (e.g., as disclosed herein or otherwise) and optical theory as appreciated by those having ordinary skill in the art in view of this disclosure, the thermo-optic coefficient can be precisely measured. Other approaches for determining thermo-optic of plates require precise knowledge of the plates size, to a precision level which are difficult or impossible to achieve with traditional systems. Embodiments can use a tuned laser methodology which is superior to traditional methods. The benefits can include a direct measurement of the actual sample and batch of which are to be used.

Embodiments (e.g., including an optical interrogator module) can include any suitable computer hardware and/or software module(s) to perform any suitable function (e.g., as disclosed herein). Any suitable method(s) or portion(s) thereof disclosed herein can be performed on and/or by any suitable hardware and/or software module(s). Any suitable method(s) and/or portion(s) thereof disclosed herein can be embodied as computer executable instructions stored on a non-transitory computer readable medium, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A thermo-optic coefficient measurement system, comprising:

a housing structure configured to retain at least a first plate sample, a second plate sample, and a third plate sample in a stacked, alternating stagger arrangement such that:

a first gap exists between the first plate sample and the third plate sample that is the thickness of the second plate sample; and a portion of the second plate sample forms an overhang that extends past outer edges of the first plate and the second plate, such that a second gap exists between the housing and the portion of the second plate sample;

a first optical device connected to the housing to output a first laser configured to be coincident with the first plate sample, the third plate sample, and the first gap, the first optical device configured to receive a first return signal;

a second optical device connected to the housing to output a second laser configured to be coincident with the portion of the second plate sample that forms the overhang, such that the second laser is oriented so as to pass through the overhang portion of the second plate but through neither the first plate nor the third plate, the second optical device configured to receive a second return signal; and an optical interrogator module configured to be connected to the first optical device to output the first laser thereto and to receive the first return signal therefrom, the optical interrogator configured to be connected to the second optical device to output the second laser thereto and to receive the second return signal therefrom, wherein the optical interrogator module is configured to determine a thermo-optical coefficient as a function of the first return signal and the second return signal at a plurality of temperatures.

2. The system of claim 1, wherein the thermo-optical interrogator module is configured to determine optical coefficient as a function of harmonic wavelengths of the first return signal and the second return signal.

3. The system of claim 1, wherein the first laser is configured to sense a change in optical path between a rear surface of the first plate sample and a front surface of the third plate sample as a function of temperature, wherein the second laser is configured to sense a change in optical path between a front surface of the second plate sample and a rear surface of a second plate sample as a function of temperature, and wherein the optical interrogator module is configured to cancel out temperature induced effects due to optical path change of the second plate sample by comparing the first return signal to the second return signal resulting in determining effects on the second plate sample due only to thermo-optic effect.

4. The system of claim 1, further comprising the first, second, and third plate samples.

5. The system of claim 4, wherein the first optical device abuts the first plate sample.

6. The system of claim 5, wherein the second optical device is spaced from the second plate sample, wherein the first and third plate samples are outside a cone of influence of the second optical device.

7. The system of claim 6, wherein the housing includes one or more portions configured to sandwich the first, second, and third plate samples together without inducing stress effects on an optically relevant order of magnitude.

8. The system of claim 1, wherein the optical interrogator module is configured to determine index of refraction of the plate samples as a function of the ratio of a static optical path measurements of the first return signal and the second return signal taken at a fixed temperature.

9. A method, comprising:

retaining a first plate sample, a second plate sample, and a third plate sample in a stacked, alternating stagger arrangement such that:

a first gap exists between the first plate sample and the third plate sample that is the thickness of the second plate sample; and a portion of the second plate sample forms an overhang that extends past outer edges of the first plate and the third plate, such that a second gap exists between the housing and the portion of the second plate sample;

interrogating the first plate sample with a first laser coincident with the first plate sample, the third plate sample, and the first gap, and receiving a first return signal thereof at a plurality of temperatures, such that the first laser passes through the first plate sample and the third plate sample, but not the second plate sample;

interrogating the second plate sample with a second laser coincident with the portion of the second plate sample that forms the overhang, and receiving a second return signal thereof at the plurality of temperatures, such that the second laser passes through the second plate sample but neither the first nor the third plate samples; and determining a thermo-optical coefficient as a function of the first return signal and the second return signal at the plurality of temperatures.

10. The method of claim 9, wherein determining the thermo-optical coefficient includes using harmonic wavelengths of the first return signal and the second return signal.

11. The method of claim 9, wherein determining the thermo-optical coefficient includes cancelling out temperature induced effects due to optical path change of the second plate sample by comparing the first return signal to the second return signal resulting in determining effects on the second plate sample due only to thermo-optic effect.

12. The method of claim 11, wherein retaining the plate samples includes abutting the first plate sample to a first optical device.

13. The method of claim 12, wherein retaining the plate samples includes spacing second plate sample from a second optical device, wherein the first and third plate samples are outside a cone of influence of the second optical device.

14. The method of claim 12, wherein retaining the plate samples includes sandwiching the first, second, and third plate samples together without inducing stress effects on an optically relevant order of magnitude.

15. The method of claim 12, further comprising holding temperature fixed and determining an index of refraction of the plate samples as a function of the ratio of a static optical path measurements of the first return signal and the second return signal taken at the fixed temperature.

* * * * *